United States Patent [19]
Tanaka

[11] Patent Number: 5,132,946
[45] Date of Patent: Jul. 21, 1992

[54] PLAYER APPARATUS FOR PLAYING INFORMATION ON AN INFORMATION RECORDING MEDIUM AND HAVING SEARCH FUNCTION

[75] Inventor: Hideo Tanaka, Saitama, Japan

[73] Assignee: Pioneer Electronic Corporation, Tokyo, Japan

[21] Appl. No.: 480,383

[22] Filed: Feb. 15, 1990

[30] Foreign Application Priority Data

Jun. 6, 1989 [JP] Japan ........................... 143384

[51] Int. Cl.[5] .............................. G11B 21/08
[52] U.S. Cl. .......................................... 369/32
[58] Field of Search ............... 369/32, 33, 36, 124; 360/72.1, 72.2

[56] References Cited

U.S. PATENT DOCUMENTS 4,805,050  2/1989  Aoyagi et al. ............... 369/32 X

Primary Examiner—Robert L. Richardson
Attorney, Agent, or Firm—Sughrue, Mion, Zinn, Macpeak & Seas

[57] ABSTRACT

An information recording medium player apparatus is provided in which a play start position on an information recording medium can be easily set by adjusting a setting means. The information recording medium player apparatus includes: a maximum address detection circuit for generating a first signal representing a maximum address of the information recording medium; a set value generation circuit for generating a second signal in accordance with a setting operation; and a target address determining circiut for determining the target start play address by multiplying the first signal by a ratio of the second signal to a maximum value which can be obtained in the setting operation.

9 Claims, 4 Drawing Sheets

PLAYER APPARATUS FOR PLAYING INFORMATION ON AN INFORMATION RECORDING MEDIUM AND HAVING SEARCH FUNCTION

BACKGROUND OF THE INVENTION

1. Field of the Invention

The present invention relates to a player apparatus for playing information recorded on an information recording medium.

2. Description of the Prior Art

In a disc player for playing a video disc, a compact disc, or the like, a search function or a fast-feed reproduction function of the disc player is conventionally used when an operator makes the player start to play from the location of a desired piece of music.

The search function searches for the address of the head of a designated piece of music on a disc by utilizing a so-called random access property or by the operation of a pickup which is movable in the radial direction of the disc so that playing of the disc is started from the position of the searched address. The fast-feed reproduction function is a function for playing a disc in the forward/reverse direction at a speed n times as fast as normal by carrying out the playing of pieces of music while periodically repeating track jumping.

It is, however, troublesome for an operator to perform such a search operation in a player since the operator is required to input a target address of a piece of music to be played including a chapter number, a frame number, a time number, and the like, into the player by using a keyboard or a remote-controller. Further, the conventional apparatus is troublesome since the operator is required to find out in advance the target address from an explanatory leaflet for the disc.

The fast-feed reproduction mode, on the other hand, is disadvantageous since a long time is required for searching or indexing.

SUMMARY OF THE INVENTION

It is therefore an object of the present invention to eliminate the foregoing disadvantages in the prior art.

It is another object of the present invention to provide an information recording medium player apparatus in which a play start position on an information recording medium can be easily set.

In order to attain the above objects, according to the present invention, the information recording medium player apparatus in which play of an information recording medium can be started from a designated target address, comprises: a maximum address detection means for generating a signal value representing a maximum address of recorded information on the information recording medium; a signal value generation means for generating a signal value in accordance with a setting operation; and a target address setting means for setting, as the target address, an address corresponding to an operation value obtained by multiplying the maximum address signal value by a ratio of a present value to a maximum value of the signal value.

DETAILED DESCRIPTION OF THE PREFERRED EMBODIMENT

Figure 1:
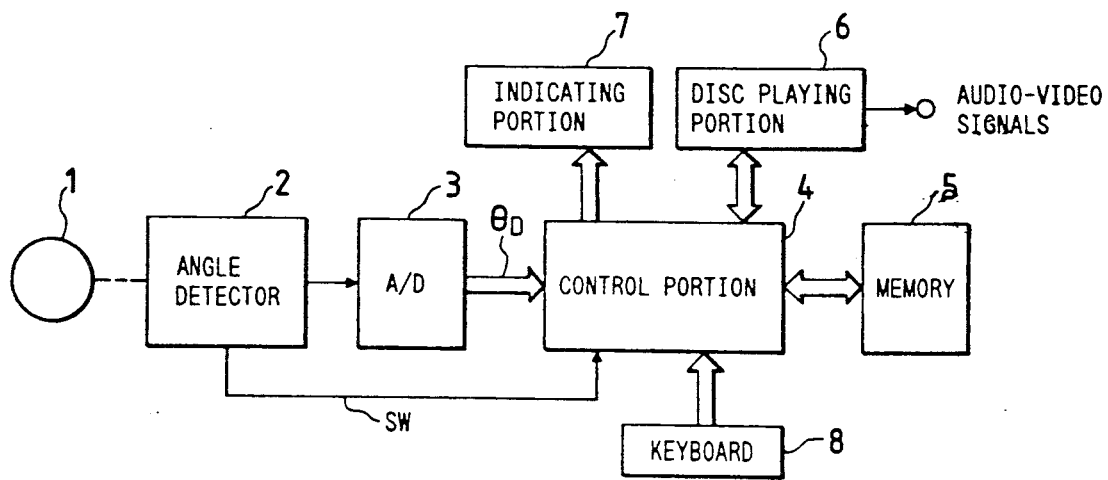
FIG. 1 is a block diagram schematically showing the configuration of an embodiment of the information recording medium player apparatus according to the present invention.

Referring to FIG. 1, the preferred embodiment of the present invention will be described hereunder.

FIG. 1 is a block diagram schematically showing the disc player to which the present invention is applied. A rotary dial 1 for setting a play start position is connected to an angle detector 2 constituted by a resistance voltage divider comprising a potentiometer or variable resistor, for example. The angle detector 2 generates a voltage output corresponding to a rotational angle of the rotary dial 1, and supplies an A/D converter 3 with the voltage output. When the position indicated by the rotary dial 1 is not the reference position of, for example, a rotational angle of zero, the angle detector 2 detects the indicated position by means of its built-in switch to thereby generate a SW-ON signal, and supplies a control portion 4 of the disc player with the SW-ON signal. The A/D converter 3 converts the output voltage representing the rotational angle into a digital angle signal $\theta_D$, and supplies the control portion 4 with the angle signal $\theta_D$.

Thus, the rotary dial 1, the angle detector 2, and the A/D converter 3 constitute an input signal generation means for generating a signal value in accordance with the setting operation by an operator.

The control portion 4 is constituted by a microprocessor unit (hereinafter referred to as an "MPU") for executing a control program stored in a memory 5 constituted by a RAM and a ROM in accordance with an instruction applied thereto from a keyboard 8 so as to control a disc playing portion 6, an indicating portion 7, and the like. The disc playing portion 6 is constituted by, for example, a disc playing mechanism and a demodulation portion. The disc playing portion 6 reads a recorded information signal on a disc by using a pickup while driving the disc to rotate. The demodulation portion demodulates an RF (radio frequency) signal read out by the pickup so as to obtain play control information and audio and video signals. The play control information is supplied to the control portion 4, and the audio and video signals are supplied to a television set (not shown) through an output terminal.

Figure 2:
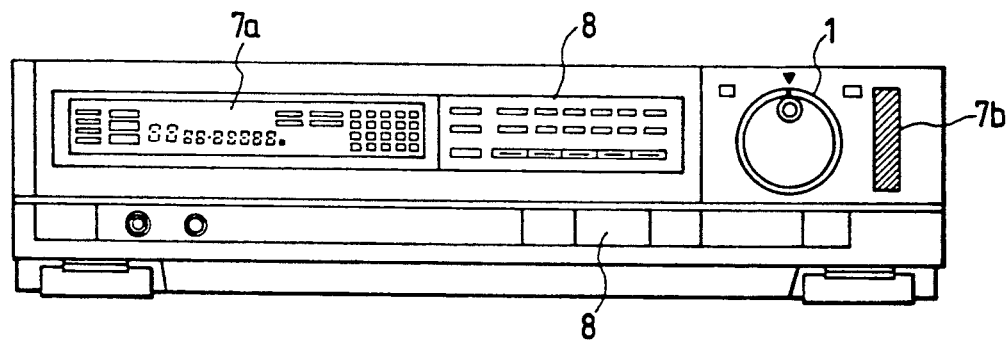
FIG. 2 is a view showing a specific example of the disc player apparatus to which the present invention is applied.

The indicating portion 7, as shown in FIG. 2, is constituted by a digital indication panel 7a for indicating play information in digital form, and an analog indication panel 7b disposed close to the rotary dial 1 for indicating a present play position in analog form. The indicating portion 7 performs indication in accordance with an indication instruction supplied from the control portion 4. FIG. 2 shows an example of the arrangement of the rotary dial 1, the indicating portion including indicators 7a and 7b, and the keyboard 8 in the disc player.

Figure 5:
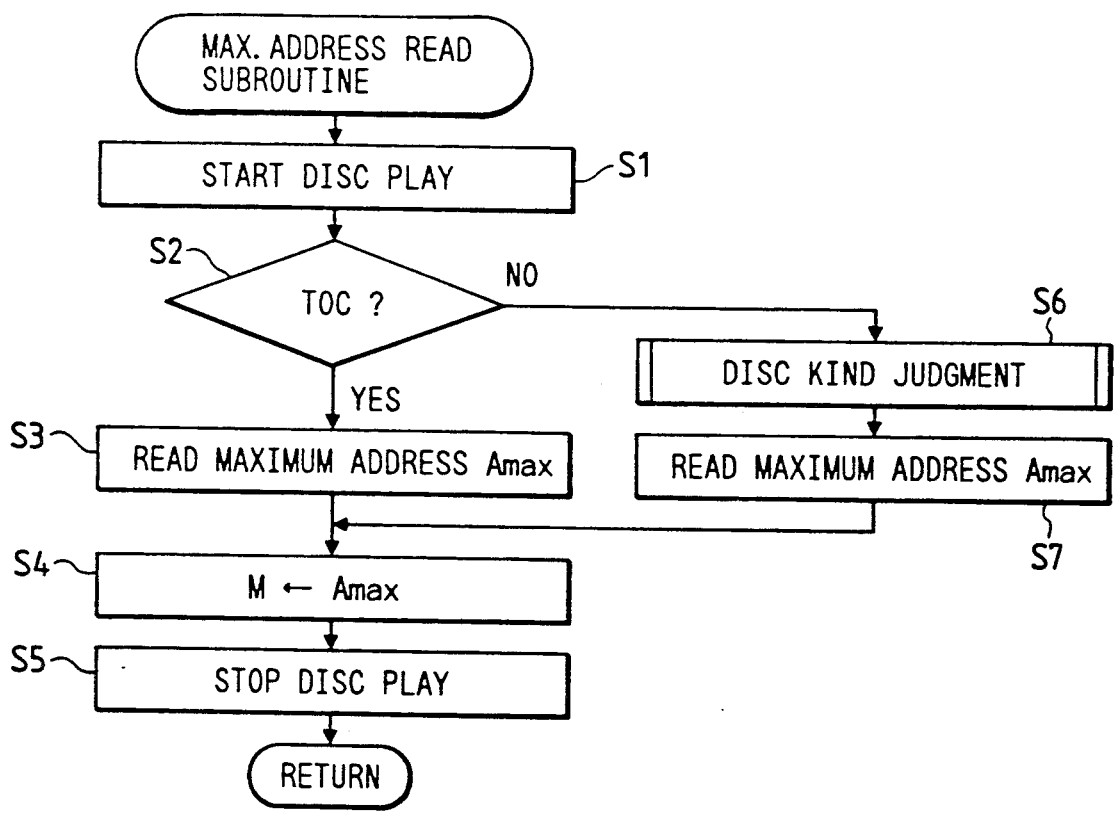
FIGS. 5 through 7 are flowcharts for explaining the operation of the control portion 4.

Next, referring to the flowchart of FIG. 5, the operation of the control portion 4 of the disc player will be described.

First, when power is supplied to the disc player, the MPU executes an initializing program (not shown), and then the MPU shifts into a main control program standing-by state.

If an operator mounts a disc on a turntable of the disc playing portion 6 during the stand-by state, the mounting of the disc is detected by a sensor (not shown). In response to this detection, the MPU executes a maximum address reading subroutine shown in FIG. 5 to read a maximum address of the mounted disc.

The MPU instructs the playing portion 6 to start playing the disc. As a result, a spindle servo (not shown) is actuated so that the disc is rotated at a predetermined rotational speed. Then, the pickup is moved to a lead-in area of the disc, and a focus servo and a tracking servo are successively actuated to start the playing of the disc. The pickup then produces a read-out RF (radio frequency) signal (step $S_1$). When the pickup has read out a TOC (Table of Contents) (step $S_2$), the MPU reads out a maximum address $A_{max}$ including a maximum time number representing the total play time, a final frame number representing a final frame, and the like, from play information recorded in the TOC (step $S_3$). The MPU stores the maximum address $A_{max}$ in a maximum address storage register M (step $S_4$).

If no TOC is detected after a predetermined time period has elapsed, or if no maximum address is recorded in a TOC area (step $S_2$), then the MPU executes a disc type judgment subroutine to determine the type of the mounted disc. The judgment is made, for example, by calculating the radius of the mounted disc and detecting CAV/CLV disc. The calculation of the radius of the mounted disc is made, for example, on the basis of the outputs of a plurality of sensors arranged in the radial direction of the disc or the result of measuring the time required for making a search from the lead-in area to the lead-out area (the distance of movement of the pickup). The detection of CAV/CLV disc is made, for example, on the basis of the difference in the number of recording frames between inner and outer tracks (step $S_6$). On the basis of the results of judging the type of disc, the MPU reads out a maximum address capacity corresponding to the judged disc from a map indicating storage capacity stored in advance for every type of disc in the memory 5 (step $S_7$), and stores the read-out maximum address capacity in the register M (step $S_4$). For example, in the case of a CLV disc having a diameter of 20 cm or 30 cm, the time number is 20 minutes or 30 minutes, respectively. The frame numbers of a CAV disc having a diameter of 30 cm is 54000 frames. Thus, the maximum address of actually-recorded music information is stored in the register M when the step $S_3$ has been executed. On the other hand, a recordable maximum address is stored in the register M when the steps $S_6$ and $S_7$ have been executed.

After reading-out the maximum address, the MPU stops the playing of the disc (step $S_5$), and returns to the main control program.

Thus, the maximum address to which the mounted disc can be played is detected in advance through the initializing operation after mounting the disc.

If the operator rotates the rotary dial 1 when the MPU is in the stand-by state in the main control program, the SW-ON signal is generated from the angle detector 2, and is supplied to the control portion 4. Upon detection of the supply of the SW-ON signal, the MPU shifts its operation to a target address detecting subroutine shown in FIG. 6.

Figure 7:
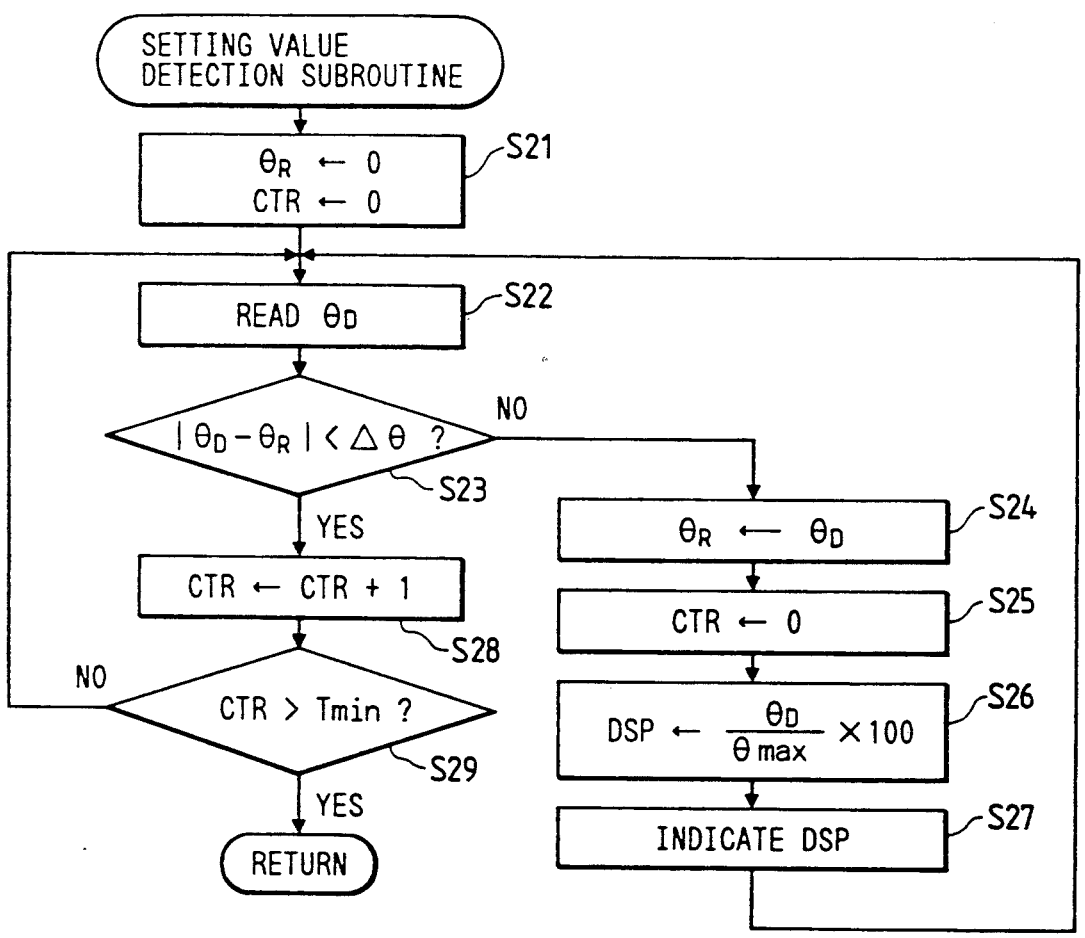

First, the MPU executes a setting value detection subroutine of FIG. 7 for detecting the rotational angle $\theta_D$ set by the operator through the operation of the rotary dial 1 (step $S_{20}$).

In the setting value detection subroutine, the MPU resets a register $\theta_R$ for storing the preceding value of the rotational angle $\theta_D$ and a counter register CTR (step $S_{21}$), and reads the angle output $\theta_D$ from the A/D converter 3 (step $S_{22}$). The MPU determine whether or not the absolute value $|\theta_D - \theta_R|$ of a difference between the angle output $\theta_D$ and the preceding value $\theta_R$ is smaller than an angle detection error $\Delta\theta$ (step $S_{23}$). When the operator is rotating the rotary dial 1 in the forward-/reverse direction, the absolute value of the difference between the present and preceding values becomes larger than the detection error $\Delta\theta$ due to vibrations. In this case, the MPU stores the present angle output $\theta_D$ in the register $\theta_R$ (step $S_{24}$), and resets the register CTR so that the register CTR does not perform a stepping operation (step $S_{25}$). The MPU performs the calculation of $(\theta_D/\theta_{max}) \times 100$ (%) so as to visually indicate the ratio of the set angle $\theta_D$ of the rotary dial 1 to the maximum rotational angle $\theta_{max}$ (step $S_{26}$), and supplies the results of the calculation to the indicating portion 7 so that the results of calculation are indicated by the indicator 7b. The maximum rotational angle $\theta_{max}$ is a value which is output from the A/D converter when the rotary dial 1 is rotated to a maximum and which is stored in advance.

Figure 3A:
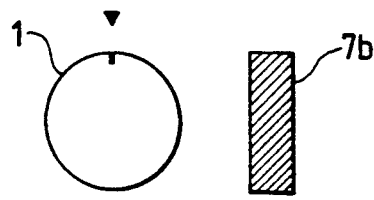
FIGS. 3(A) and 3(B) are views for explaining the relation between the rotary dial 1 and the indicator 7b.
Figure 3B:
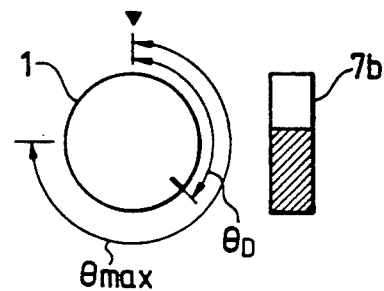

FIG. 3 (A) shows the state of the indicator 7b when the rotary dial 1 is set to the reference position; FIG. 3(B) shows the state of the indicator 7b when the rotary dial 1 is rotated from the reference position by the angle output $\theta_D$ (step $S_{27}$).

Thus, the ratio of the set angle of the rotary dial 1 set by the operator to the maximum rotational angle is visually indicated. That is, the general designated position of the target address of the information recording medium relative to the maximum address of the same, is visually indicated.

The MPU reads the output of the A/D converter 3 again (step $S_{22}$). If a difference between the present and preceding values $\theta_D$ and $\theta_R$ exceeds the detection error $\Delta\theta$ (step $S_{23}$), the steps $S_{22}$ through $S_{27}$ are repeated so that the rotational angle of the rotary dial 1 is followed by indication of the indicator 7b.

When the rotation of the rotary dial 1 is stopped, the difference between the present and preceding values $\theta_D$ and $\theta_R$ does not exceed the detection error $\Delta\theta$ (step $S_{23}$). At this time, the MPU makes the register CTR perform a stepping operation (step $S_{28}$), and determines whether or not the count value exceeds time $T_{min}$ corresponding to a predetermined waiting time (step $S_{29}$). If $T_{min}$ has not elapsed, the MPU repeats steps $S_{22}$ through $S_{29}$ to await the lapse of $T_{min}$.

If $T_{min}$ has elapsed when the rotary dial is stopped, on the contrary, the setting of the play start position by the rotary dial 1 is completed. Therefore, the MPU returns to the step $S_{20}$ to execute the target address detecting subroutine.

Figure 6:
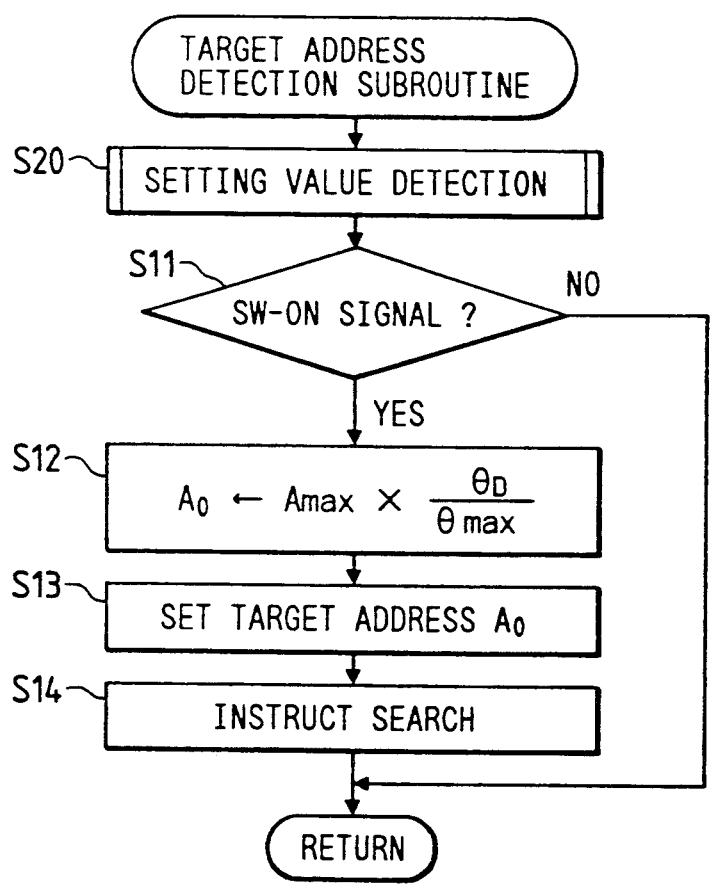

After having read the rotational angle $\theta_D$ set by the operator as described, the MPU confirms the fact that the rotary dial 1 has not been returned to the reference position by the existence of the SW-ON signal as shown in FIG. 6 (step $S_{11}$), and performs an operation to obtain a target address $A_O$ to be searched. The target address $A_O$ is obtained by multiplying the maximum address $A_{max}$ by the ratio of $(\theta_D/\theta_{max})$ (step $S_{12}$). The MPU sets the thus obtained target address $A_O$ in a target address register for the search operation (step $S_{13}$), and generates a search instruction (step $S_{14}$). Then, the MPU returns to the main control program.

If the judgment proves that the SW-ON signal does not exist in step $S_{11}$, the MPU ends the target address detecting subroutine and returns to the main control program because the play start position is not set by the rotary dial 1.

If the search instruction is generated by the target address detecting subroutine, the MPU shifts the operation into a search mode (not shown) and moves the pickup to the target address to start the play of music. The form of the search mode after the target address has been designated is disclosed in detail in Japanese Patent Unexamined Publication No. 64-76573. That is, the search mode corresponding to a difference in distance between the present address and target address is selected so that a minimum time search is executed, and the play of music is started.

Thus, a play start position on an information recording medium can be designated only by rotation of the rotary dial 1 by an operator.

Figure 4:
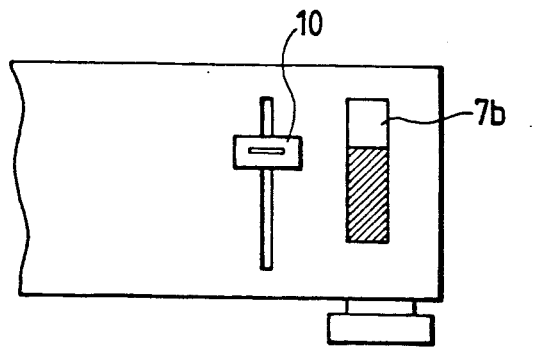
FIG. 4 is a view showing a specific example in which the sliding lever is used in place of the rotary dial.

FIG. 4 shows an example in which a sliding lever 10 is used in place of the rotary dial 1. In this case, a linear movement type sliding resistor connected to the sliding lever 10 for generating a voltage corresponding to the sliding position of the sliding lever 10 is used as the signal value generation means. Alternatively, a variable frequency oscillator can be used as the signal value generation means.

Although the case where the present invention is applied to a disc player has been described in the above embodiment, the present invention can be applied to a video tape recorder for playing an information recorded tape. In this case, for example, it will suffice to use a tape fast-feed function together with a residual tape detection function so that the playing of music is started after a calculated target address corresponds to a residual tape.

Further, although the rotary dial is exclusively used for setting a target address in the above embodiment, a jog shuttle dial which is generally used at present for a disc player or a VTR may be used also for setting a target address.

As described above, in the information recording medium player according to the present invention, when an operator sets a play start position in the analog form by using the rotary dial, the lever, or the like, the MPU calculates a target address corresponding to the set position and searches from the target address on an information recording medium so as to start music playing from the position. Therefore, unlike the conventional player, it is not necessary for an operator to know the address of music in advance and to input the address through a keyboard. By briefly setting a play start position on an information recording medium by a very simple operation, the operator can start playing a desired piece of music.

What is claimed is:

1. An information recording medium player apparatus in which play of an information recording medium can be started from a designated target address, said apparatus comprising:
   maximum address detection means for generating a first signal representing a maximum address on an information recording medium;
   input signal generation means for generating a second signal in accordance with a desired setting; and
   target address determining means for determining a target address;
   wherein said target address determining means determines the product of a first factor and a second factor, said first factor representing said first signal, said second factor representing a ratio of a set value to a maximum value, said set value representing said second signal, said maximum value being the maximum attainable value of said set value, and said product determining said target address.

2. An information recording medium player apparatus according to claim 1, wherein said maximum address detection means detects said information recording medium, categorizes said information recording medium as one of a plurality of different predetermined types, and generates said first signal corresponding to the detected type of said information recording medium.

3. An information recording medium player apparatus according to claim 2, wherein said maximum address detection means generates said first signal based on a maximum address available for recording on said detected type of information recording medium.

4. An information recording medium player apparatus according to claim 1, wherein said maximum address determining means generates said first signal based on a maximum address of previously recorded information on said information recording medium.

5. An information recording medium player apparatus according to claim 1, wherein said input signal generation means comprises:
   means for setting a play start position;
   angle detector means for generating a voltage output corresponding to an output of said setting means; and
   A/D converter means for converting said output voltage generated by said angle detector means into a digital angle signal.

6. An information recording medium player apparatus according to claim 5, wherein said setting means comprises a rotary dial.

7. An information recording medium player apparatus according to claim 5, wherein said setting means comprises a sliding lever.

8. An information recording medium player apparatus according to claim 1, wherein said maximum address detection means comprises a microprocessor.

9. An information recording medium player apparatus according to claim 1, wherein said target address determining means comprises a microprocessor.

* * * * *